S. G. STEVENS.
DOOR OPERATING DEVICE FOR HOPPER CARS.
APPLICATION FILED MAY 16, 1917. RENEWED DEC. 9, 1920.

1,374,248. Patented Apr. 12, 1921.

INVENTOR.
S. Geo. Stevens.

UNITED STATES PATENT OFFICE.

SYLVESTER GEO. STEVENS, OF DULUTH, MINNESOTA.

DOOR-OPERATING DEVICE FOR HOPPER-CARS.

1,374,248.            Specification of Letters Patent.      Patented Apr. 12, 1921.

Application filed May 16, 1917, Serial No. 169,151. Renewed December 9, 1920. Serial No. 429,583.

*To all whom it may concern:*

Be it known that I, SYLVESTER GEORGE STEVENS, a citizen of the United States, residing at Duluth, in the county of St. Louis and State of Minnesota, have invented certain new and useful Improvements in Door-Operating Devices for Hopper - Cars, of which the following is a specification, reference being had therein to the accompanying drawing.

This invention consists of certain improvements in car trapping means and relates particularly to such a device for the opening and closing of the trap doors on hopper-bottom cars, such as iron ore cars and the like.

The principal object is to produce simple portable means by which cars may be trapped by power, the same being accomplished in a much more efficient and expeditious manner than heretofore.

Another object is to produce such a device in combination with a receiving structure such as an ore dock or the like, where granular material is stored prior to being loaded into vessels and whereby the annoyance and delay, incident to hand trapping, is overcome.

Other objects and advantages of the combination will appear in the further description of the invention.

In the accompanying drawings.

Figure 1:
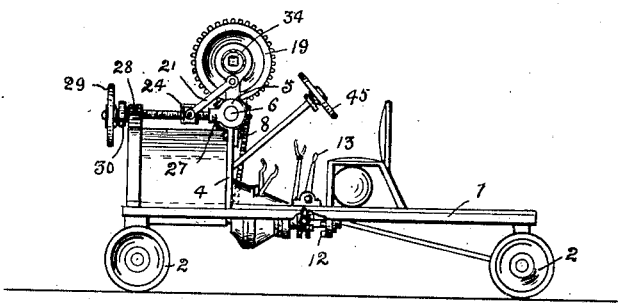
Figure 1 is a side elevation of the trapping automobile.
Figure 2:
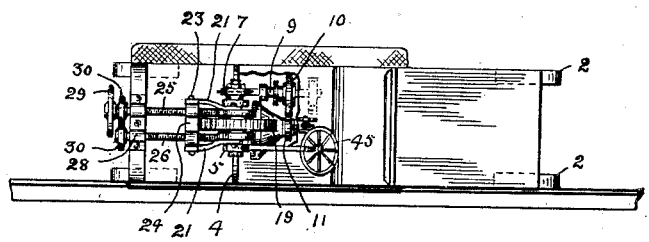
Fig. 2 is a top plan view of same.

1 represents the chassis of an automobile such as the Ford, and above the engine housing or hood of which, the trapping mechanism is mounted.

In constructing the device, the axles of the chassis are made comparatively short, and small wheels 2 mounted thereupon, as high speed of the car is not required.

A laterally extending platform or shelf 3 is preferably pivotally attached to either side of the body of the chassis and which may be raised or lowered as desired, thus providing a suitable working platform for the operator of the trapping device.

Upon the upper edge of the dashboard 4, of the automobile are rigidly fixed two upwardly extending brackets 5—5 in which is journaled the shaft 6. This shaft extends beyond one of the brackets 5 and has rigidly fixed to such extending portion, a sprocket wheel 7, which is illustrated as being driven by a sprocket chain 8 leading from and actuated by the counter shaft 9 mounted in the chassis parallel with the drive shaft of the automobile.

The counter shaft 9 is driven in any desired manner from the power unit of the automobile such as by spur gears 10 and 11, one of which may be made slidable upon its shaft, whereby it may be engaged or disengaged with the other and the counter shaft thus thrown into or out of coöperative engagement with the drive shaft of the machine.

It is evident that this operative connection must be made with the reversible portion of the drive shaft of the automobile and which connection I have shown directly back of the gear casing. This is to provide for the trapping mechanism being operated in either direction by manipulation of the same levers that operate the automobile.

Two arms 14—14 are spaced apart and loosely mounted upon the shaft 6, they having elongated hub portion 15 for the purpose of establishing a substantial bearing upon the shaft. These arms have formed upon their upwardly extending free ends, hub like portions 16, the opposed inner faces of which are circularly recessed in such a manner as to encircle the laterally extending ends 17—17 of the hub 18 of the large gear 19, referred to herein as the bull-wheel; the arms 14—14 in this manner form a substantial pivotal support for said bull-wheel.

A relatively small spurred gear 20, is fixed to the shaft 6 intermediate the hubs 15 of the arms 14—14 and which gear imparts motion to the bull-wheel with which it is in permanent engagement, thus the bull-wheel 19 is pivotally mounted upon the shaft 6 and rotatable within the free ends of the arms 14—14.

Braces 21—21 are pivotally connected at one end as at 22, one to each arm 14 and the opposite ends of the braces are pivotally connected as at 23, to a transversely disposed crosshead 24, which is reciprocally mounted upon two parallel oppositely screw threaded rods 25 and 26. These rods are supported at one end in extensions 27 of the brackets 5 and at the other end journaled within suitable bearings 28, mounted upon the radiator of the automobile. The ends of the rods extend some distance beyond the front of the radiator, one having mounted thereupon the handwheel 29 and each carrying intermeshing spurred gear wheels 30, whereby when the one 25 is operated by the handwheel, motion is imparted to the other in the opposite direction by virtue of said gear wheels 30. Thus when the rods are rotated by the handwheel 29, the crosshead 24 will travel either to or from the shaft 6, as the case may be.

By this traveling of the crosshead, the braces 21 will determine the radial position of the arms 14—14 carrying the bull-wheel, and the latter raised and lowered by such adjustment.

The object of this adjustment is to provide for the variation in height of the trapping shaft in hopper-bottom cars. This variation rarely exceeds from three to four inches, and it is possible that this adjustment of the bull-wheel may not be essential, but I have illustrated same as provision against such necessity.

The hub of the bull-wheel 19 has formed therethrough, a square hole 31, the walls of which hole are rounded as at 32, to permit of slight rocking of the shaft 33, which extends therethrough, when circumstances require same, the object of which is obvious.

The shaft 33 is longitudinally adjustably mounted within said hole, carrying upon one end a loosely fitting chuck-head 34, said head having a square hole 35 in the center thereof and longitudinally protruding fingers 36, spaced apart about the outer rim thereof; said head being fixed to the end of the shaft 33 by means of a through bolt 37 or other convenient yieldable connections. The opposite end of the shaft 33 has mounted thereupon, any convenient form of handle 38, whereby the shaft may be manually reciprocated and adjusted.

All hopper-bottom cars of the character described and as fragmentally illustrated at 39, have journaled therein, a heavy trapping shaft 40, the squared end 41 of which extends beyond a plane with the side of the car and to which is usually applied a hand-wrench for rotating the shaft; during the trapping process with my improved means, the chuck-head 34 is designed to engage this square end 41 of the shaft when the trapping automobile is properly positioned for such purpose.

In some cases, the trapping shafts of such cars are provided with hand-wheels upon the protruding ends thereof, which are designed to obviate the necessity of a handwrench and to engage such hand-wheels with the chuck-head 34, I provide the fingers 36, above described, which will engage the spokes of the wheel when contacting same.

Figures 3, 4:
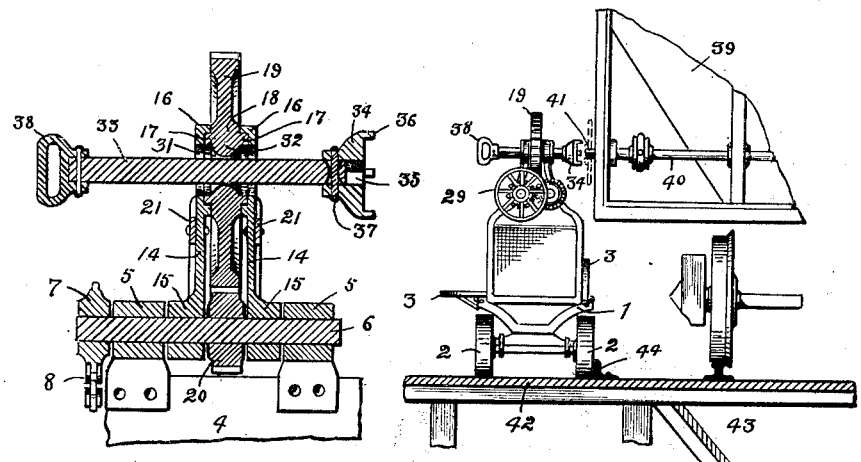
Fig. 3 is a vertical sectional view through the center of the bull-wheel of the trapping device.
Fig. 4 is a front elevation of the device about to engage the trapping shaft upon a hopper-bottom car mounted upon an ore dock.

42 represents the deck of an ore dock having pockets 43 therein, into which ore cars discharge their burden prior to the latter being loaded into vessels for further transportation, and in Fig. 4, I have illustrated the trapping automobile and guiding means in combination with such a dock.

The guiding means comprises an angle bar 44, rigidly fixed to the upper surface of the dock and spaced the proper distance from the track upon which the ore cars travel and against which guide rail the wheels upon one side of the trapping automobile are designed to be kept when the device is in operation.

The steering of the automobile is accomplished by the wheel 45 as is well known in the art, the connection of the front wheels or front axle being made in any convenient manner not shown.

The trapping device is operated by two men, one at the steering wheel and having control of the automobile, and the other stands upon the platform 3 applies chuck 34 to the end of the trapping shaft on the cars when the automobile is properly alined therewith. When such application is made and maintained by the second operator, the first operator performs the proper adjustment of levers to connect the trapping mechanism with the engine of the automobile and thereby rotates the bull-wheel in either direction desired, it requiring usually but two revolutions of the wheel to perform either the trapping or untrapping operation.

The invention is not confined to the specific construction of parts herein shown, as many modifications of the same may be resorted to without departing beyond the scope thereof: which is defined in the following claims.

What I claim is—

1. A trapping and untrapping device for hopper-bottom cars having door operating shafts transverse the cars, comprising in combination a self propelled vehicle, a transverse manually reciprocal shaft superimposed upon the vehicle, for engaging and operating the transverse shafts upon the cars, means for raising and lowering the manually controlled shaft to suit different heights of cars and means for operating the latter shaft from the motor that drives the vehicle.

2. A trapping and untrapping device for hopper-bottom cars having door operating transverse shafts therein, comprising in combination a portable mechanism, a manually reciprocal chuck carrying a shaft therein for engagement with the door operating shafts of the cars, means for raising and lowering the chuck shaft to suit different heights of cars and means for imparting rotary motion to the chuck shaft for the pose set forth.

3. The combination in a trapping and untrapping device for hopper-bottom cars, of a self propelled vehicle, a laterally disposed hand reciprocable and vertically adjustable shaft carried by the vehicle and means for applying rotary motion to the shaft from the motor of the vehicle.

4. The combination in a trapping and untrapping device for hopper-bottom cars, of a self propelled vehicle and horizontally manually reciprocable and vertically adjustable means intermittently operatively connected with the motor of the vehicle.

5. A trapping and untrapping device for hopper-bottom cars having door operating transverse shafts therein, comprising in combination an automobile, a superimposed rotating transverse shaft upon the automobile, a central support for said shaft permitting limited pivotal motion thereof, a clutch at one end of the shaft for engagement with the door operating shafts of the cars and a handle at the opposite end of the shaft for manipulating same.

6. In a device of the character described, a supporting vehicle, a superimposed horizontally disposed reciprocable pivotally supported clutch carrying shaft carried by the vehicle and means for mechanically rotating same.

7. The combination with a self propelled vehicle, of a reciprocable horizontally disposed pivotally supported shaft and means carried by the vehicle for mechanically rotating the shaft independently of the motion of the vehicle.

8. The combination with a vehicle carrying a reciprocable horizontally disposed clutch carrying shaft, of a handle fixed to one end of the shaft whereby it may be reciprocated directly by hand, and means for mechanically rotating the shaft for the purpose described.

In testimony whereof I hereunto affix my signature in the presence of two witnesses.

SYLVESTER GEO. STEVENS.

Witnesses:
W. H. DENHAM,
(Miss) B. McKINNON.